(12) United States Patent
Nakamura

(10) Patent No.: US 9,873,779 B2
(45) Date of Patent: Jan. 23, 2018

(54) RUBBER COMPOSITION FOR TIRE AND TIRE

(71) Applicant: SUMITOMO RUBBER INDUSTRIES, LTD., Kobe-shi, Hyogo (JP)

(72) Inventor: Masanobu Nakamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 99 days.

(21) Appl. No.: 14/983,130

(22) Filed: Dec. 29, 2015

(65) Prior Publication Data

US 2016/0215126 A1    Jul. 28, 2016

(30) Foreign Application Priority Data

Jan. 28, 2015    (JP) .................................. 2015-014461

(51) Int. Cl.
| | |
|---|---|
| *C08L 9/06* | (2006.01) |
| *B60C 1/00* | (2006.01) |
| *C08K 3/36* | (2006.01) |
| *C08K 5/548* | (2006.01) |

(52) U.S. Cl.
CPC ........ *C08L 9/06* (2013.01); *B60C 1/00* (2013.01); *C08K 3/36* (2013.01); *C08K 5/548* (2013.01); *C08K 2201/006* (2013.01)

(58) Field of Classification Search
CPC ..................................... C08L 9/06; B60C 1/00
See application file for complete search history.

(56) References Cited

U.S. PATENT DOCUMENTS

| 6,066,752 A * | 5/2000 | Takata .................... C01B 17/22 |
| | | 423/566.2 |
| 6,194,594 B1 | 2/2001 | Gorl et al. |
| 2003/0176719 A1 * | 9/2003 | Yanagisawa .............. B60C 1/00 |
| | | 556/427 |
| 2008/0027166 A1 | 1/2008 | Hochi et al. |
| 2008/0110544 A1 * | 5/2008 | Nakamura ............ B60C 1/0025 |
| | | 152/525 |

FOREIGN PATENT DOCUMENTS

| JP | 10-87675 A | 4/1998 |
| JP | 2000-103794 A | 4/2000 |
| JP | 2003-261580 A | 9/2003 |
| JP | 2005-47963 A | 2/2005 |
| JP | 2008-50570 A | 3/2008 |
| JP | 2013-147532 A | 8/2013 |

* cited by examiner

*Primary Examiner* — Lanee Reuther
(74) *Attorney, Agent, or Firm* — Birch, Stewart, Kolasch & Birch, LLP

(57) ABSTRACT

A rubber composition for tire inhibits increase in a Mooney viscosity and has satisfactory processability, abrasion resistance and mechanical strength. The rubber composition for tire comprises: 10 to 120 parts by mass of silica having a nitrogen adsorption specific surface area of 150 m$^2$/g or more, based on 100 parts by mass of a rubber component, and 1 to 25 parts by mass of a silane coupling agent comprising a polysulfide coupling agent represented by the following formula (1), based on 100 parts by mass of the silica, wherein the polysulfide coupling agent comprises 83 to 87% by mass of disulfide of x=2 measured by high performance liquid chromatography and has a pH value of 7.7 to 8.2,

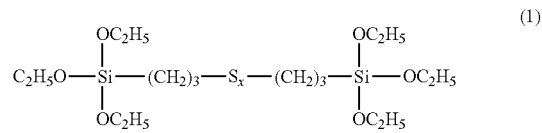

(wherein x is an integer of 1 or more and has a distribution).

7 Claims, No Drawings

RUBBER COMPOSITION FOR TIRE AND TIRE

TECHNICAL FIELD

The present invention relates to a rubber composition for tire and a tire comprising a tire member made of the rubber composition for tire.

BACKGROUND OF THE INVENTION

Recently, there is an increasing interest in efforts to environmental problems such as energy saving and resource saving. In tires for automobiles, decrease in hysteresis loss and loss tangent (tan δ) of a rubber composition is known a means for fuel efficiency, and blending of silica brings about advantages such as decrease in a rolling resistance and increase in wet grip performance.

However, silica is inferior in reinforcing property and abrasion resistance as compared with carbon black. In order to improve reinforcing property and abrasion resistance, making fuel efficiency compatible with abrasion resistance by using silica having a large nitrogen absorption specific surface area or by blending two kinds of silica having different specific surface areas has been proposed (JP 2008-50570 A). However, in the case of silica having a large nitrogen absorption specific surface area, an interaction between silica particles is strong and aggregation occurs easily as compared with silica having a small nitrogen absorption specific surface area, and therefore, a Mooney viscosity of a rubber compound increases and thus, processability is lowered.

Generally in the case of blending silica to a rubber, a coupling agent is added to decrease a Mooney viscosity and increase a modulus. However, in the case of silica having a large nitrogen absorption specific surface area, since sufficient dispersion cannot be obtained and a Mooney viscosity cannot be decreased, deterioration of abrasion resistance is brought about, and thus there is a limit in dispersion of silica.

While fuel efficiency is improved by using silica and a silane coupling agent, in the case of insufficient dispersion of silica, degradation of processability, abrasion resistance and mechanical strength occurs in many cases due to increase in a Mooney viscosity. Thus, there is a room for improvement from technical point of view.

SUMMARY OF THE INVENTION

It is an object of the present invention to provide a rubber composition inhibiting increase in a Mooney viscosity and having good processability, abrasion resistance and mechanical strength and a tire having a tire member made of the rubber composition.

Namely, the present invention relates to:

[1] a rubber composition for tire comprising:
10 to 120 parts by mass, preferably 20 to 110 parts by mass, more preferably 40 to 100 parts by mass of silica having a nitrogen adsorption specific surface area of 150 m$^2$/g or more, preferably 160 to 500 m$^2$/g, more preferably 170 to 300 m$^2$/g, based on 100 parts by mass of a rubber component, and
1 to 25 parts by mass, preferably 1.5 to 15 parts by mass, more preferably 2.5 to 10 parts by mass of a silane coupling agent comprising a polysulfide coupling agent represented by the following formula (1), based on 100 parts by mass of silica, wherein the polysulfide coupling agent comprises 83 to 87% by mass of disulfide of x=2 measured by high performance liquid chromatography and has a pH value of 7.7 to 8.2, preferably 7.9 to 8.2,

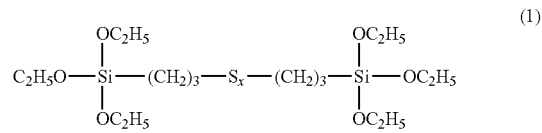

(wherein x is an integer of 1 or more and has a distribution),
[2] the rubber composition for tire of the above [1], wherein a total sulfur content of the polysulfide coupling agent is from 14.0 to 15.0% by mass, preferably 14.3 to 14.7% by mass,
[3] the rubber composition for tire of the above [1] or [2], wherein a DBP oil absorption of the silica is 240 ml/100 g or less, preferably 220 ml/100 g or less, more preferably 200 ml/100 g or less, and
[4] a tire produced using the rubber composition for tire of any one of the above [1] to [3].

According to the present invention, it is possible to provide a rubber composition having a good Mooney viscosity and being excellent in processability, abrasion resistance and mechanical strength by compounding a specific silica and a specific silane coupling agent in predetermined amounts based on 100 parts by weight of a rubber component, and a tire produced using the rubber composition.

DETAILED DESCRIPTION

The rubber composition for tire of the present invention is featured by comprising: 10 to 120 parts by mass of silica having a nitrogen adsorption specific surface area of 150 m$^2$/g or more, based on 100 parts by mass of a rubber component, and 1 to 25 parts by mass of a silane coupling agent comprising a polysulfide coupling agent represented by the following formula (1), based on 100 parts by mass of the silica, wherein the polysulfide coupling agent comprises 83 to 87% by mass of disulfide of x=2 measured by high performance liquid chromatography and has a pH value of 7.7 to 8.2,

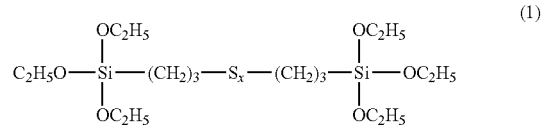

(wherein x is an integer of 1 or more and has a distribution).

The rubber component being usable in the present invention is not limited particularly, and a natural rubber (NR), an epoxidized natural rubber (ENR), an isoprene rubber (IR), a butadiene rubber (BR), a styrene butadiene rubber (SBR), a styrene-isoprene-butadiene rubber (SIBR), a chloroprene rubber (CR), an acrylonitrile-butadiene rubber (NBR), an ethylene-propylene-diene rubber (EPDM), a butyl rubber (IIR) and a halogenated butyl rubber (X-IIR), and the like may be used. Diene rubbers such as NR, ENR, BR, SBR, SIBR, CR and NBR are preferably used, and especially NR, ENR, BR, and SBR are more preferable since the required performance for each tire member can be easily secured.

These rubber components may be used alone, or may be used in combination with two or more thereof. These rubber components may be ones, in which a main chain or a terminal thereof has been modified with a modifying agent, or may be ones having partially a branched structure resulting from the use of a polyfunctional modifying agent, for example, tin tetrachloride or silicon tetrachloride. A compounding amount of each type of the rubber component can be appropriately selected depending on a member to which the rubber composition is applied.

The natural rubber is not limited particularly, and natural rubbers generally used in the rubber industries may be used. Examples thereof include SIR20, RSS#3, TSR20, and the like.

The butadiene rubber is not limited particularly, and for example, a high cis-1,4-polybutadiene rubber (high-cis BR), a butadiene rubber containing 1,2-syndiotactic polybutadiene crystal (SPB-containing BR), a modified butadiene rubber (modified BR), and the like may be used. Among them, the high-cis BR having a cis content of 95% by mass or more is preferable since an effect of increasing abrasion resistance is high.

A BR content in 100% by mass of a rubber component is preferably 5% by mass or more, more preferably 10% by mass or more. By setting the BR content in the rubber component to be 5% by mass or more, there are tendencies that a sufficient abrasion resistance can be obtained and fuel efficiency, abrasion resistance and wet grip performance can be enhanced in good balance. The BR content in 100% by mass of the rubber component is preferably 50% by mass or less, more preferably 35% by mass or less. By setting the BR content in the rubber component to be 50% by mass or less, there are tendencies that sufficient wet grip performance can be obtained and fuel efficiency, abrasion resistance and wet grip performance can be enhanced in good balance.

The styrene-butadiene rubber is not limited particularly, and styrene-butadiene rubbers generally used in the rubber industries such as an emulsion-polymerized styrene-butadiene rubber (E-SBR), a solution-polymerized styrene-butadiene rubber (S-SBR), and modified SBRs thereof (modified E-SBR, modified S-SBR) may be used. Among them, the S-SBR is preferable since a balance of processability and grip performance is excellent.

A SBR content in 100% by mass of the rubber component is preferably not less than 50% by mass, more preferably not less than 65% by mass. When the SBR content in the rubber component is not less than 50% by mass, there are tendencies that sufficient wet grip performance can be obtained and fuel efficiency, abrasion resistance and wet grip performance can be enhanced in good balance. The SBR content in 100% by mass of the rubber component is preferably not more than 95% by mass, more preferably not more than 90% by mass. When the SBR content in the rubber component is not more than 95% by mass, there are tendencies that sufficient abrasion resistance can be obtained and fuel efficiency, abrasion resistance and wet grip performance can be enhanced in good balance.

The silica to be used in the present invention is not limited particularly as far as it has a nitrogen adsorption specific surface area of 150 m$^2$/g or more. Examples thereof include dry processed silica (anhydrous silica), wet processed silica (hydrous silica), and the like, and the wet processed silica is preferred since it has many silanol groups.

The nitrogen adsorption specific surface area ($N_2SA$) of the silica to be used in the present invention is 150 m$^2$/g or more, preferably 160 m$^2$/g or more, more preferably 170 m$^2$/g or more. When the nitrogen adsorption specific surface area of the silica is less than 150 m$^2$/g, there is a tendency that breaking strength after vulcanization is lowered. Further, $N_2SA$ of the silica is preferably 500 m$^2$/g or less, more preferably 300 m$^2$/g or less. When the nitrogen adsorption specific surface area of the silica exceeds 500 m$^2$/g, there is a tendency that low heat build-up property and processability of a rubber are lowered. The nitrogen adsorption specific surface area of the silica is a value measured by the BET method in accordance with ASTM D3037-81.

A DBP oil absorption (dibutyl phthalate oil absorption) of the silica to be used in the present invention is preferably 240 ml/100 g or less, more preferably 220 ml/100 g or less, further preferably 200 ml/100 g or less. By adjusting the DBP oil absorption of the silica to be 240 ml/100 g or less, there is a tendency that the both of excellent processability and abrasion resistance can be obtained. A lower limit of the DBP oil absorption is not limited particularly. The DBP oil absorption of the silica is measured in accordance with JIS K6217-4: 2008.

A content of silica is 10 parts by mass or more, preferably 20 parts by mass or more, more preferably 40 parts by mass or more, based on 100 parts by mass of the rubber component. When the silica content is less than 10 parts by mass, low heat build-up property might be insufficient. Further, the silica content is 120 parts by mass or less, preferably 110 parts by mass or less, more preferably 100 parts by mass or less, based on 100 parts by mass of the rubber component. When the silica content exceeds 120 parts by mass, there are tendencies that dispersion of a filler in the rubber becomes difficult, and processability of the rubber is lowered.

The present invention is featured by using, as a silane coupling agent, a polysulfide coupling agent which is represented by the following formula (1), comprises 83 to 87% by mass of disulfide of x=2 measured by high performance liquid chromatography, and has a pH value of 7.7 to 8.2, thereby improving dispersibility of the silica in the rubber component, decreasing a Mooney viscosity, and making it possible to produce a rubber composition having enough processability and being excellent in abrasion resistance. Although other silane coupling agent may be used together, it is preferable to use only the polysulfide coupling agent which is represented by the following formula (1), comprises 83 to 87% by mass of disulfide of x=2 measured by high performance liquid chromatography, and has a pH value of 7.7 to 8.2,

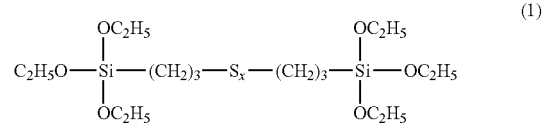

(1)

(wherein x is an integer of 1 or more and has a distribution).

The polysulfide silane represented by the above formula (1) is a mixture of polysulfide silanes having different sulfur chain lengths (x) since x is an integer of 1 or more and has a distribution. Such mixture can be prepared by a method well-known in the art.

A content of disulfide (x=2) can be measured by high performance liquid chromatography (HPLC). When measuring this polysulfide silane by HPLC, there appear peaks corresponding to polysulfide silanes having a respective sulfur chain length (x) in the obtained chart. Further, an area ratio (%) of each peak area to a total peak area is obtained as a peak area ratio (%), which corresponds to the content (% by mass) of the polysulfide silane having the respective sulfur chain length (x). In the present invention, the content of the disulfide (x=2) is from 83 to 87% by mass. When the content of the disulfide (x=2) is less than 83% by mass, there is a tendency that fuel efficiency and reinforcing property are lowered. When the content of the disulfide (x=2) exceeds 87% by mass, there is a tendency that processability is lowered.

A pH value of the polysulfide coupling agent to be used in the present invention is 7.7 or more, preferably 7.9 or more. When the pH value is less than 7.7, there is a tendency that fuel efficiency and reinforcing property are lowered. The pH value of the polysulfide coupling agent is 8.2 or less, and when the pH value exceeds 8.2, there is a tendency that processability is lowered. The pH value of the polysulfide coupling agent can be obtained by suspending a polysulfide coupling agent in water, stirring the suspension for several hours, allowing the suspension to stand and then measuring a pH value of the resulting supernatant.

A total sulfur content in the polysulfide coupling agent to be used in the present invention is not limited particularly, and is preferably 14.0% by mass or more, more preferably 14.3% by mass or more. When the total sulfur content is 14.0% by mass or more, there is a tendency that lowering of fuel efficiency and reinforcing property can be prevented. The total sulfur content in the polysulfide coupling agent is not limited particularly, and is preferably 15.0% by mass or less, more preferably 14.7% by mass or less. When the total sulfur content is 15.0% by mass or less, there is a tendency that lowering of processability can be prevented.

A content of the silane coupling agent is 1 part by mass or more, preferably 1.5 parts by mass or more, more preferably 2.5 parts by mass or more based on 100 parts by mass of the silica. When the content of the silane coupling agent is less than 1 part by mass, dispersing the silica satisfactorily might be difficult. The content of the silane coupling agent is 25 parts by mass or less, preferably 15 parts by mass or less, more preferably 10 parts by mass or less based on 100 parts by mass of the silica. Even if the content of the silane coupling agent is increased over 25 parts by mass, there are tendencies that an effect of improving dispersion of the silica cannot be obtained and cost is increased unnecessarily. Further, there is a tendency that processability in kneading and extruding is lowered.

The rubber composition for tire of the present invention contains a specific silica in a predetermined amount, and other fillers used generally as a white filler in the rubber industry such as calcium carbonate, mica such as sericite, aluminum hydroxide, magnesium oxide, magnesium hydroxide, clay talc, alumina and titanium oxide can be added to the rubber composition.

It is preferable that the rubber composition for tire of the present invention contains carbon black, which allows a more satisfactory reinforcing effect to be obtained and can increase an effect of preventing whitening. Usable carbon black is not limited particularly, and examples thereof include GPF, FEF, HAF, ISAF, SAF, and the like.

The nitrogen adsorption specific surface area ($N_2SA$) of the carbon black is preferably 10 $m^2/g$ or more, more preferably 20 $m^2/g$ or more. When the $N_2SA$ of the carbon black is less than 10 $m^2/g$, there is are tendencies that sufficient weather resistance cannot be obtained and abrasion resistance is lowered. The $N_2SA$ of the carbon black is preferably 280 $m^2/g$ or less, more preferably 250 $m^2/g$ or less. When the $N_2SA$ of the carbon black exceeds 280 $m^2/g$, there are tendencies that dispersibility is inferior and abrasion resistance is lowered. The nitrogen adsorption specific surface area of the carbon black can be obtained by the method A of JIS K6217.

Preferred as a carbon black are those having an average particle size of 31 nm and/or a DBP oil absorption of 100 ml/100 g or more. By compounding such a carbon black, a required reinforcing property can be provided, block rigidity, abrasion resistance and breaking strength can be secured, and the effect of the present invention can be obtained remarkably.

When the average particle size of the carbon black exceeds 31 nm, the breaking strength might be decreased to a large extent. The average particle size is more preferably 25 nm or less. Further, the average particle size is preferably 15 nm or more, more preferably 19 nm or more. When less than 15 nm, a viscosity of the blended rubber may be increased to a large extent, and processability might be decreased. In the present invention, the average particle size is a number average particle size and is measured with a transmission electron microscope.

When the DBP oil absorption (dibutyl phthalate oil absorption) of the carbon black is less than 100 ml/100 g, reinforcing property might be lowered, and it might be difficult to secure breaking strength. The above-mentioned DBP oil absorption is more preferably 105 ml/100 g or more, further preferably 110 ml/100 g or more. Further, the DBP oil absorption is preferably 160 ml/100 g or less, more preferably 150 ml/100 g or less. When the DBP oil absorption exceeds 160 ml/100 g, it is difficult to produce carbon black itself. The DBP oil absorption of the carbon black is measured in accordance with JIS K6217-4: 2001.

When the rubber composition comprises carbon black, its content based on 100 parts by mass of the rubber component is preferably 1 part by mass or more, more preferably 3 parts by mass or more, and is preferably 150 parts by mass or less, more preferably 100 parts by mass or less. When the content of carbon black is from 1 to 150 parts by mass, mechanical strength of the rubber can be secured and good weather resistance can be obtained. The carbon black may be used alone, and two or more thereof can be used in combination. Further, when considering depletion of petroleum resources in the future, it is preferable to use renewable carbon black prepared using a biological raw material.

In the rubber composition for tire of the present invention, other compounding agents generally used in rubber industries such as stearic acid, zinc oxide, various anti-aging agents, a wax, and a softener such as oil can be suitably compounded according to the necessity.

Oil is not limited particularly, and for example, process oils, vegetable oils or a mixture thereof can be used. Examples of the usable process oils are paraffin process oil, aromatic process oil and naphthenate process oil.

As anti-aging agents each of amine, phenol and imidazole compounds, and carbamic acid metal salts can be selected suitably and compounded, and these anti-aging agents may be used alone or may be used in combination of two or more thereof. Among these, amine anti-aging agents are preferable from the viewpoint that ozone resistance can be improved remarkably, and N-(1,3-dimethylbutyl)-N'-phenyl-p-phenylenediamine is more preferable.

With respect to a wax, stearic acid and zinc oxide, those which are used generally in rubber industries can be used suitably.

To the rubber composition for tire of the present invention, a vulcanizing agent such as sulfur or a sulfur compound, and a vulcanization accelerator can be blended.

The vulcanizing agent is not limited particularly, and those which are generally used in rubber industries can be used, and those containing sulfur atoms are preferable and powdered sulfur is used particularly preferably.

The vulcanization accelerators are also not limited particularly, and those which are generally used in rubber industries can be used.

The rubber composition for tire of the present invention is prepared by a usual method used in rubber industries. Namely, the rubber composition can be prepared by a method of kneading each of the above-mentioned components in a Banbury mixer, a kneader, an open roll or the like and then conducting vulcanization, or the like method.

The rubber composition for tire of the present invention can be used suitably, for example, for tire members such as a cap tread, a base tread, an under-tread, a clinch apex, a bead apex, a side wall, a breaker cushion rubber, a rubber for covering a carcass cord, a reinforcing layer for a run flat tire, insulation, a chafer, and an inner liner. The rubber composition is excellent in processability and abrasion resistance, and therefore, can be used suitably for a tire tread, especially for a cap tread of a tire.

The tire of the present invention can be produced with a general method using the rubber composition for tire of the present invention. Namely, the rubber composition for tire of the present invention is, in the unvulcanized state, processed by extrusion into a shape of each member (for example, a tread) of a tire and then molding together with other tire members on a tire molding machine in a general method to produce an unvulcanized tire. This unvulcanized tire is heated and pressurized in a vulcanizer and the tire of the present invention can be produced.

The tire of the present invention may be either of a pneumatic tire or an airless (solid) tire, and a pneumatic tire is particularly preferable.

Example

The present invention is explained by means of Examples, but is not limited to only the Examples.

Preparation Example 1

Preparation of Coupling Agent

Into a 500 ml 3-necked flask were poured 125 g of ethanol, 40 g (0.5 mol) of anhydrous sodium sulfide and 16 g (0.5 mol) of sulfur while flowing dried nitrogen gas thereinto, followed by dropwise addition of a mixture of 120.2 g (0.5 mol) of 3-chloropropyltriethoxysilane and 60.2 g (0.5 mol) of n-hexyl chloride at 75° C. After heating to reflux for eight hours, ethanol was distilled off under reduced pressure and generated sodium chloride was filtered off to obtain triethoxypropylsilyldisulfide (S-1).

Preparation Example 2

Preparation of Coupling Agent

Into a 500 ml 3-necked flask were poured 125 g of ethanol, 40 g (0.5 mol) of anhydrous sodium sulfide and 12.8 g (0.40 mol) of sulfur while flowing dried nitrogen gas thereinto, followed by dropwise addition of a mixture of 120.2 g (0.5 mol) of 3-chloropropyltriethoxysilane and 60.2 g (0.5 mol) of n-hexyl chloride at 75° C. After heating to reflux for eight hours, ethanol was distilled off under reduced pressure and generated sodium chloride was filtered off to obtain triethoxypropylsilyldisulfide (S-2).

Preparation Example 3

Preparation of Coupling Agent

Into a 500 ml 3-necked flask were poured 125 g of ethanol, 40 g (0.5 mol) of anhydrous sodium sulfide and 16 g (0.5 mol) of sulfur while flowing dried nitrogen gas thereinto, followed by dropwise addition of a mixture of 120.2 g (0.5 mol) of 3-chloropropyltriethoxysilane and 48.2 g (0.4 mol) of n-hexyl chloride at 75° C. After heating to reflux for eight hours, ethanol was distilled off under reduced pressure and generated sodium chloride was filtered off to obtain triethoxypropylsilyldisulfide (S-3).

Preparation Example 4

Preparation of Coupling Agent

Into a 500 ml 3-necked flask were poured 125 g of ethanol, 40 g (0.5 mol) of anhydrous sodium sulfide and 20.8 g (0.65 mol) of sulfur while flowing dried nitrogen gas thereinto, followed by dropwise addition of a mixture of 120.2 g (0.5 mol) of 3-chloropropyltriethoxysilane and 60.2 g (0.5 mol) of n-hexyl chloride at 75° C. After heating to reflux for twelve hours, ethanol was distilled off under reduced pressure and generated sodium chloride was filtered off to obtain triethoxypropylsilyldisulfide (S-4).

Preparation Example 5

Preparation of Coupling Agent

Into a 500 ml 3-necked flask were poured 125 g of ethanol, 40 g (0.5 mol) of anhydrous sodium sulfide and 11.2 g (0.35 mol) of sulfur while flowing dried nitrogen gas thereinto, followed by dropwise addition of a mixture of 120.2 g (0.5 mol) of 3-chloropropyltriethoxysilane and 60.2 g (0.5 mol) of n-hexyl chloride at 75° C. After heating to reflux for twelve hours, ethanol was distilled off under reduced pressure and generated sodium chloride was filtered off to obtain triethoxypropylsilyldisulfide (S-5).

Preparation Example 6

Preparation of Coupling Agent

Into a 500 ml 3-necked flask were poured 115 g of ethanol, 10 g of distilled water, 40 g (0.5 mol) of anhydrous sodium sulfide and 11.2 g (0.35 mol) of sulfur while flowing dried nitrogen gas thereinto, followed by dropwise addition of a mixture of 120.2 g (0.5 mol) of 3-chloropropyltriethoxysilane and 60.2 g (0.5 mol) of n-hexyl chloride at 75° C. After heating to reflux for twelve hours, ethanol was distilled off under reduced pressure and generated sodium chloride was filtered off to obtain triethoxypropylsilyldisulfide (S-6).

Each of physical properties of the coupling agents obtained in Preparation Examples 1 to 6 and Si75 available from EVONIK-DEGUSSA as S-7 were determined in accordance with the following method. The results are shown in Table 1.

<Analysis of Amounts of Sulfur Components>

Proportions of distributed sulfur components Sx were calculated from peak areas (%) obtained by high performance liquid chromatography (HPLC).

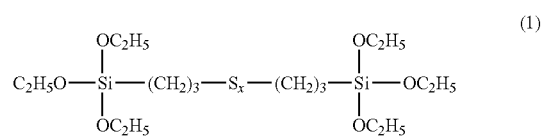

(1)

Conditions for analysis by HPLC are as follows.
HPLC: HLC-8020 available from TOSO CORPORATION
Ultraviolet (UV) detector: UV-8010 (254 nm) available from TOSO CORPORATION
Column: TSKgel ODS-80TM CTR available from TOSO CORPORATION (inner dia.: 4.6 mm, length: 10 cm)
Measuring temperature: 40° C.
Concentration of sample: A sample of 0.06 g was measured and was dissolved in 10 ml of acetonitrile.
Amount of poured sample: 5 µl
Condition for elution: A flow rate of 1 ml/min
Mobile phase: Elution was conducted for 2 minutes with a mixed solution of acetonitrile:water=9:1 and then with gradient to 100% of acetonitrile for 18 minutes.

<Analysis of Total Sulfur Content>

A sample of 0.03 g was measured, and the sample was wrapped with a combustion filter paper. Ten cm³ of hydrogen peroxide/chlorine absorbing solution was added into a combustion flask, and thereafter, oxygen was passed in the flask for about 30 seconds. The filter paper was burned with the combustion bottle being inclined, to burn the sample completely. The flask was allowed to stand for two hours to completely dissolve a gas in the absorbing solution.

The content in the flask was poured into a 250 cm³ flask. Side walls of the combustion flask and the sample carrier were washed with 5 cm³ water, and the washing solution was poured into the same 250 cm³ flask as above. Washing with water was further conducted two times. The solution and the washing water were collected in a 100 cm³ Erlenmeyer flask and were boiled to decompose excessive hydrogen peroxide. The solution was evaporated until its volume became 5 to 10 cm³.

A sufficient amount of 2-propanol was added to the test solution so that its alcohol content became 70 to 90%. A rotator was put in the flask, and the flask was placed on a magnetic stirrer. Into the flask was added 2 to 3 drops of an indicator of thorin solution. Titration was conducted by adding a barium perchlorate solution dropwise using a micro burette. Further, the same procedure was repeated without adding a sample to carry out a blank test. A percentage by mass of the total sulfur content was obtained by the following equation. The results are shown in Table 1.

$$\frac{(v_t - v_b) \times 0.0321 \times c \times 100}{m^2}$$

$v_b$: Volume of a solution of barium perchlorate required for the titration in the blank test (cm³)
$v_t$: Volume of a solution of barium perchlorate required for the titration of the sample (cm³)
c: Concentration of a solution of barium perchlorate (mol/dm³)
$m^2$: Mass of the sample (g)
0.0321: Mass of 1 mmol sulfur (g)

<Method of Determining pH Value>

A sample of 10 g was measured and poured into a beaker, and 40 g of water was added thereto, followed by stirring for 4 hours. After the stirring, the sample was allowed to stand for about 30 minutes, and a supernatant was dispensed. An electrode for measuring a pH value was put in the supernatant to measure a pH value. The results are shown in Table 1.

TABLE 1

|  | S-1 | S-2 | S-3 | S-4 | S-5 | S-6 | S-7 |
| --- | --- | --- | --- | --- | --- | --- | --- |
| $S_2$ (% by mass) | 84.1 | 86.7 | 84.4 | 81.1 | 87.9 | 88.2 | 85.0 |
| $S_3$ (% by mass) | 14.0 | 12.6 | 14.4 | 17.4 | 11.5 | 10.1 | 13.5 |
| $S_{4-8}$ (% by mass) | 0.9 | 0.7 | 1.2 | 1.5 | 0.6 | 0.7 | 1.5 |
| Total sulfur content (% by mass) | 14.3 | 14.1 | 14.5 | 14.9 | 14.2 | 14.1 | 14.2 |
| pH value | 7.8 | 8.1 | 8.5 | 7.8 | 8.2 | 9.0 | 8.4 |

Various kinds of chemicals used in Examples and Comparative Examples are collectively shown below.
SBR: Buna (registered trade mark) VSL 2525-0 (S-SBR, styrene content: 25% by mass, vinyl content: 25% by mass) available from LANXESS CORPORATION
BR: UBEPOL BR (registered trade mark) 150B (1,4-cis content: 97% by mass, $ML_{1+4}$ (100° C.): 40, Mw/Mn: 3.3) available from Ube Industries, Ltd.
Carbon black: DIABLACK I (ISAF carbon, $N_2SA$: 114 m²/g, average particle size: 23 nm, DBP oil absorption: 114 ml/100 g) available from Mitsubishi Chemical Corporation
Silica (1): ULTRASIL (registered trade mark) VN3 ($N_2SA$: 175 m²/g, average primary particle size: 15 nm, DBP oil absorption: 185 ml/100 g) available from EVONIK-DEGUSSA
Silica (2): Premium 200MP ($N_2SA$: 200 m²/g, average primary particle size: 10 nm, DBP oil absorption: 220 ml/100 g) available from SOLVAY Silane coupling agent: S-1 to S-6 obtained in Preparation Examples 1 to 6 and S-7 (Si75 available from EVONIK-DEGUSSA)
Oil: TDAE oil available from JX Nippon Oil & Energy Corporation
Wax: Ozoace-0355 available from NIPPON SEIRO CO., LTD.
Zinc oxide: Zinc oxide II available from MITSUI MINING & SMELTING CO., LTD.
Stearic acid: Stearic acid "Tsubaki" available from NOF CORPORATION Anti-aging agent: NOCRAC 6C (N-phenyl-N'-(1,3-dimethylbutyl)-p-phenylenediamine) (6PPD) available from OUCHI SHINKO CHEMICAL INDUSTRIAL CO., LTD.
Sulfur: Sulfur powder available from TSURUMI CHEMICAL INDUSTRY CO., LTD.
Vulcanization accelerator (1): NOCCELER NS (N-tert-butyl-2-benzothiazolylsulfenamide) available from OUCHI SHINKO CHEMICAL INDUSTRIAL CO., LTD.
Vulcanization accelerator (2): NOCCELER D (N,N'-diphenylguanidine) available from OUCHI SHINKO CHEMICAL INDUSTRIAL CO., LTD.

Examples 1 to 8 and Comparative Examples 1 to 20

According to the formulation shown in each of Tables 2 to 5, all chemicals other than sulfur and vulcanization accelerators were kneaded with a 1.7 L Banbury mixer. Then, sulfur and the vulcanization accelerators were added to the resulting kneaded product followed by kneading by using a roll to obtain an unvulcanized rubber composition. The obtained unvulcanized rubber composition was press-vulcanized under a condition of 170° C. for 15 minutes with a 2 mm metallic mold to obtain a vulcanized rubber product. A part of the obtained unvulcanized rubber composition was subjected to testing for evaluation of processability and workability in a manner mentioned below, and the vulcanized rubber product was subjected to testing for evaluation of rubber strength and abrasion resistance in a manner mentioned below. The results are shown in Tables 2 to 5.

<Skin of Rubber>

A skin of a rubber sheet (surface shape) just after the kneading and the extrusion was evaluated in accordance with the following criteria. As the skin of a rubber sheet (surface shape) gets worse, it means that the workability is lower. The targeted level of performance is at least B level.

A: A skin of rubber sheet (surface shape) is very good.
B: A skin of rubber sheet (surface shape) is good.
C: A skin of rubber sheet (surface shape) is not good.
D: A skin of rubber sheet (surface shape) is not so good.

<Processability: Determination of Mooney viscosity>

A Mooney viscosity ($ML_{1+4}$) of the obtained unvulcanized rubber composition was determined under the temperature condition of 130° C. according to JIS K 6300-1 "Unvulcanized rubber—Physical properties—Part. 1: Method for measuring viscosity and scorch time using a Mooney viscometer". Regarding a Mooney viscosity index of Comparative Example 1 as 100, a Mooney viscosity of each formulation was expressed as an index by the following equation. As the index is larger, the Mooney viscosity is lower and processability is more excellent. A performance target value is 95 or more, and an index of 105 or more is preferable.

(Processability index)=($ML_{1+4}$ of Comparative Example 1)/($ML_{1+4}$ of each formulation)×100

<Rubber Strength>

A tensile test was carried out according to JIS K6251 "vulcanized rubber and thermoplastic rubber—Calculation of tensile characteristics", using No. 3 dumbbell type test piece comprising each vulcanized rubber composition under an atmosphere of 23° C., and an elongation at break (EB) (%) and a tensile strength at break (TB) (MPa) of the vulcanized rubber composition were measured. Regarding the rubber strength index of Comparative Example 1 as 100, EB×TB for each formulation was expressed as an index by the following equation. The larger the rubber strength index is, the more excellent the rubber strength at break and mechanical strength are. A performance target value is 105 or more.

(Rubber strength index)=(EB×TB of each formulation)/(EB×TB of Comparative Example 1)×100

<Abrasion Resistance>

An abrasion loss of each vulcanized rubber composition was measured with a Lambourn abrasion testing machine under the conditions of a room temperature, a load of 1.0 kgf, and a slip rate of 30%. Reciprocals of the obtained abrasion losses were calculated, and the reciprocals of abrasion losses were expressed as indices regarding a reciprocal of an abrasion loss of Comparative Example 1 as 100. As an index is larger, abrasion resistance is excellent. A performance target value is 90 or more, and an index of 105 or more is preferable.

TABLE 2

|  | Example | | Comparative Example | | | | |
|---|---|---|---|---|---|---|---|
|  | 1 | 2 | 1 | 2 | 3 | 4 | 5 |
| Components (part by mass) | | | | | | | |
| SBR | 60 | 60 | 60 | 60 | 60 | 60 | 60 |
| BR | 40 | 40 | 40 | 40 | 40 | 40 | 40 |
| Carbon black | 5 | 5 | 5 | 5 | 5 | 5 | 5 |
| Silica (1) | 100 | 100 | 100 | 100 | 100 | 100 | 100 |
| Silica (2) | — | — | — | — | — | — | — |
| Silane coupling agent | | | | | | | |
| S-1 | 8 | — | — | — | — | — | — |
| S-2 | — | 8 | — | — | — | — | — |
| S-3 | — | — | 8 | — | — | — | — |
| S-4 | — | — | — | 8 | — | — | — |
| S-5 | — | — | — | — | 8 | — | — |
| S-6 | — | — | — | — | — | 8 | — |
| S-7 | — | — | — | — | — | — | 8 |
| Oil | 20 | 20 | 20 | 20 | 20 | 20 | 20 |
| Wax | 2 | 2 | 2 | 2 | 2 | 2 | 2 |
| Zinc oxide | 2 | 2 | 2 | 2 | 2 | 2 | 2 |
| Stearic acid | 2 | 2 | 2 | 2 | 2 | 2 | 2 |
| Anti-oxidant | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 |
| Vulcanization accelerator (1) | 1.5 | 1.5 | 1.5 | 1.5 | 1.5 | 1.5 | 1.5 |
| Vulcanization accelerator (2) | 1.5 | 1.5 | 1.5 | 1.5 | 1.5 | 1.5 | 1.5 |
| Results of evaluation | | | | | | | |
| Skin of rubber | A | A | B | C | D | D | B |
| Index of processability | 115 | 112 | 100 | 114 | 99 | 92 | 102 |
| Index of rubber strength | 112 | 114 | 100 | 98 | 103 | 104 | 101 |
| Index of abrasion resistance | 110 | 108 | 100 | 93 | 96 | 90 | 101 |

TABLE 3

|  | Example | | Comparative Example | | | | |
|---|---|---|---|---|---|---|---|
|  | 3 | 4 | 6 | 7 | 8 | 9 | 10 |
| Components (part by mass) | | | | | | | |
| SBR | 60 | 60 | 60 | 60 | 60 | 60 | 60 |
| BR | 40 | 40 | 40 | 40 | 40 | 40 | 40 |
| Carbon black | 5 | 5 | 5 | 5 | 5 | 5 | 5 |
| Silica (1) | 20 | 20 | 20 | 20 | 20 | 20 | 20 |
| Silica (2) | — | — | — | — | — | — | — |
| Silane coupling agent | | | | | | | |
| S-1 | 1.6 | — | — | — | — | — | — |
| S-2 | — | 1.6 | — | — | — | — | — |
| S-3 | — | — | 1.6 | — | — | — | — |
| S-4 | — | — | — | 1.6 | — | — | — |
| S-5 | — | — | — | — | 1.6 | — | — |
| S-6 | — | — | — | — | — | 1.6 | — |
| S-7 | — | — | — | — | — | — | 1.6 |
| Oil | 20 | 20 | 20 | 20 | 20 | 20 | 20 |
| Wax | 2 | 2 | 2 | 2 | 2 | 2 | 2 |
| Zinc oxide | 2 | 2 | 2 | 2 | 2 | 2 | 2 |
| Stearic acid | 2 | 2 | 2 | 2 | 2 | 2 | 2 |
| Anti-oxidant | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 |
| Vulcanization accelerator (1) | 1.5 | 1.5 | 1.5 | 1.5 | 1.5 | 1.5 | 1.5 |
| Vulcanization accelerator (2) | 1.5 | 1.5 | 1.5 | 1.5 | 1.5 | 1.5 | 1.5 |
| Results of evaluation | | | | | | | |
| Skin of rubber | A | A | A | A | B | B | B |
| Index of processability | 203 | 198 | 175 | 189 | 170 | 165 | 175 |
| Index of rubber strength | 150 | 147 | 130 | 126 | 133 | 131 | 129 |

TABLE 3-continued

| | Example | | Comparative Example | | | | |
|---|---|---|---|---|---|---|---|
| | 3 | 4 | 6 | 7 | 8 | 9 | 10 |
| Index of abrasion resistance | 95 | 94 | 85 | 81 | 82 | 79 | 83 |

TABLE 4

| | Example | | Comparative Example | | | | |
|---|---|---|---|---|---|---|---|
| | 5 | 6 | 11 | 12 | 13 | 14 | 15 |
| Components (part by mass) | | | | | | | |
| SBR | 60 | 60 | 60 | 60 | 60 | 60 | 60 |
| BR | 40 | 40 | 40 | 40 | 40 | 40 | 40 |
| Carbon black | 5 | 5 | 5 | 5 | 5 | 5 | 5 |
| Silica (1) | 110 | 110 | 110 | 110 | 110 | 110 | 110 |
| Silica (2) | — | — | — | — | — | — | — |
| Silane coupling agent | | | | | | | |
| S-1 | 14 | — | — | — | — | — | — |
| S-2 | — | 14 | — | — | — | — | — |
| S-3 | — | — | 14 | — | — | — | — |
| S-4 | — | — | — | 14 | — | — | — |
| S-5 | — | — | — | — | 14 | — | — |
| S-6 | — | — | — | — | — | 14 | — |
| S-7 | — | — | — | — | — | — | 14 |
| Oil | 20 | 20 | 20 | 20 | 20 | 20 | 20 |
| Wax | 2 | 2 | 2 | 2 | 2 | 2 | 2 |
| Zinc oxide | 2 | 2 | 2 | 2 | 2 | 2 | 2 |
| Stearic acid | 2 | 2 | 2 | 2 | 2 | 2 | 2 |
| Anti-oxidant | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 |
| Vulcanization accelerator (1) | 1.5 | 1.5 | 1.5 | 1.5 | 1.5 | 1.5 | 1.5 |
| Vulcanization accelerator (2) | 1.5 | 1.5 | 1.5 | 1.5 | 1.5 | 1.5 | 1.5 |
| Results of evaluation | | | | | | | |
| Skin of rubber | B | B | C | C | D | D | C |
| Index of processability | 186 | 187 | 95 | 99 | 93 | 88 | 94 |
| Index of rubber strength | 140 | 140 | 95 | 94 | 98 | 90 | 91 |
| Index of abrasion resistance | 91 | 90 | 98 | 93 | 94 | 90 | 99 |

TABLE 5

| | Example | | Comparative Example | | | | |
|---|---|---|---|---|---|---|---|
| | 7 | 8 | 16 | 17 | 18 | 19 | 20 |
| Components (part by mass) | | | | | | | |
| SBR | 60 | 60 | 60 | 60 | 60 | 60 | 60 |
| BR | 40 | 40 | 40 | 40 | 40 | 40 | 40 |
| Carbon black | 5 | 5 | 5 | 5 | 5 | 5 | 5 |
| Silica (1) | — | — | — | — | — | — | — |
| Silica (2) | 100 | 100 | 100 | 100 | 100 | 100 | 100 |
| Silane coupling agent | | | | | | | |
| S-1 | 10 | — | — | — | — | — | — |
| S-2 | — | 10 | — | — | — | — | — |
| S-3 | — | — | 10 | — | — | — | — |
| S-4 | — | — | — | 10 | — | — | — |
| S-5 | — | — | — | — | 10 | — | — |
| S-6 | — | — | — | — | — | 10 | — |
| S-7 | — | — | — | — | — | — | 10 |
| Oil | 20 | 20 | 20 | 20 | 20 | 20 | 20 |
| Wax | 2 | 2 | 2 | 2 | 2 | 2 | 2 |
| Zinc oxide | 2 | 2 | 2 | 2 | 2 | 2 | 2 |
| Stearic acid | 2 | 2 | 2 | 2 | 2 | 2 | 2 |
| Anti-oxidant | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 |
| Vulcanization accelerator (1) | 1.5 | 1.5 | 1.5 | 1.5 | 1.5 | 1.5 | 1.5 |
| Vulcanization accelerator (2) | 1.5 | 1.5 | 1.5 | 1.5 | 1.5 | 1.5 | 1.5 |
| Results of evaluation | | | | | | | |
| Skin of rubber | B | B | B | C | C | D | D |
| Index of processability | 95 | 95 | 90 | 89 | 87 | 86 | 89 |
| Index of rubber strength | 111 | 111 | 102 | 99 | 101 | 103 | 101 |
| Index of abrasion resistance | 113 | 114 | 105 | 98 | 100 | 96 | 103 |

From the results shown in Tables 2 to 5, it is seen that the rubber composition for tire of the present invention is a rubber composition having good skin of rubber and being excellent in processability, rubber strength and abrasion resistance. In Comparative Example 2 where the silane coupling agent having a small $S_2$ content, it is seen that the skin of rubber was degraded, and that while the Mooney viscosity was good, rubber strength and abrasion resistance were not sufficient. In Comparative Example 3 where the silane coupling agent having a large $S_2$ content, it is seen that the skin of rubber was degraded remarkably, and abrasion resistance was lowered slightly. In Comparative Example 4 where the silane coupling agent having a high pH value and a large $S_2$ content, it is seen that the skin of rubber was degraded remarkably, and processability and abrasion resistance were also lowered greatly.

What is claimed is:
1. A rubber composition for a tire comprising:
   10 to 120 parts by mass of silica having a nitrogen adsorption specific surface area of 150 m²/g or more, based on 100 parts by mass of a rubber component, and
   1 to 25 parts by mass of a silane coupling agent comprising a polysulfide coupling agent represented by the following formula (1), based on 100 parts by mass of silica,
   wherein the polysulfide coupling agent comprises 83 to 87% by mass of a disulfide of x=2 measured by high performance liquid chromatography and has a pH value of 7.7 to 8.2,

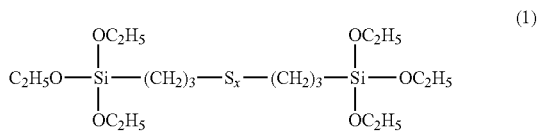

(1)

wherein x is an integer of 1 or more and has a distribution.
2. The rubber composition for a tire of claim 1, wherein a total sulfur content of the polysulfide coupling agent is from 14.0 to 15.0% by mass.
3. The rubber composition for a tire of claim 2, wherein a DBP oil absorption of the silica is 240 ml/100 g or less.
4. A tire comprising a tire member composed of the rubber composition for a tire of claim 3.

5. A tire comprising a tire member composed of the rubber composition for a tire of claim 2.

6. The rubber composition for a tire of claim 1, wherein a DBP oil absorption of the silica is 240 ml/100 g or less.

7. A tire comprising a tire member composed of the rubber composition for a tire of claim 1.

* * * * *